United States Patent [19]

Stokes et al.

[11] 4,428,194
[45] Jan. 31, 1984

[54] COMPRESSOR BLEED AIR CONTROL APPARATUS AND METHODS

[75] Inventors: Richard F. Stokes, Phoenix; James D. Timm, Tempe; Stephen R. LaCroix, Scottsdale; Milton R. Adams, Tempe, all of Ariz.

[73] Assignee: The Garrett Corporation, Los Angeles, Calif.

[21] Appl. No.: 424,674

[22] Filed: Sep. 27, 1982

Related U.S. Application Data

[62] Division of Ser. No. 235,794, Feb. 19, 1981, Pat. No. 4,380,893.

[51] Int. Cl.³ ............................................. F04D 27/02
[52] U.S. Cl. .................................. 60/39.02; 60/39.07; 415/27
[58] Field of Search ................ 60/39.02, 39.07, 39.27, 60/39.29; 415/28, 27; 417/405, 406

[56] References Cited

U.S. PATENT DOCUMENTS

| 1,052,172 | 2/1913 | Rateau | 415/27 |
| 2,994,471 | 8/1961 | Lewis | 417/406 |
| 3,047,210 | 7/1962 | Best | 415/27 |
| 3,411,702 | 11/1968 | Metot et al. | 415/27 |

FOREIGN PATENT DOCUMENTS 1021797  3/1966  United Kingdom ................ 415/27

Primary Examiner—Louis J. Casaregola
Attorney, Agent, or Firm—J. Richard Konneker; Albert J. Miller

[57] ABSTRACT

A turbine engine accessory power unit has a compressor bleed air control system in which a surge bleed valve is proportionally and integrally controlled to maintain a constant minimum compressor bleed flow rate slightly above the compressor's surge flow rate. The system control parameter is automatically reset as a function of the position of the compressor's adjustable inlet guide vanes to assure optimum control system performance throughout the air delivery range of the compressor.

4 Claims, 6 Drawing Figures

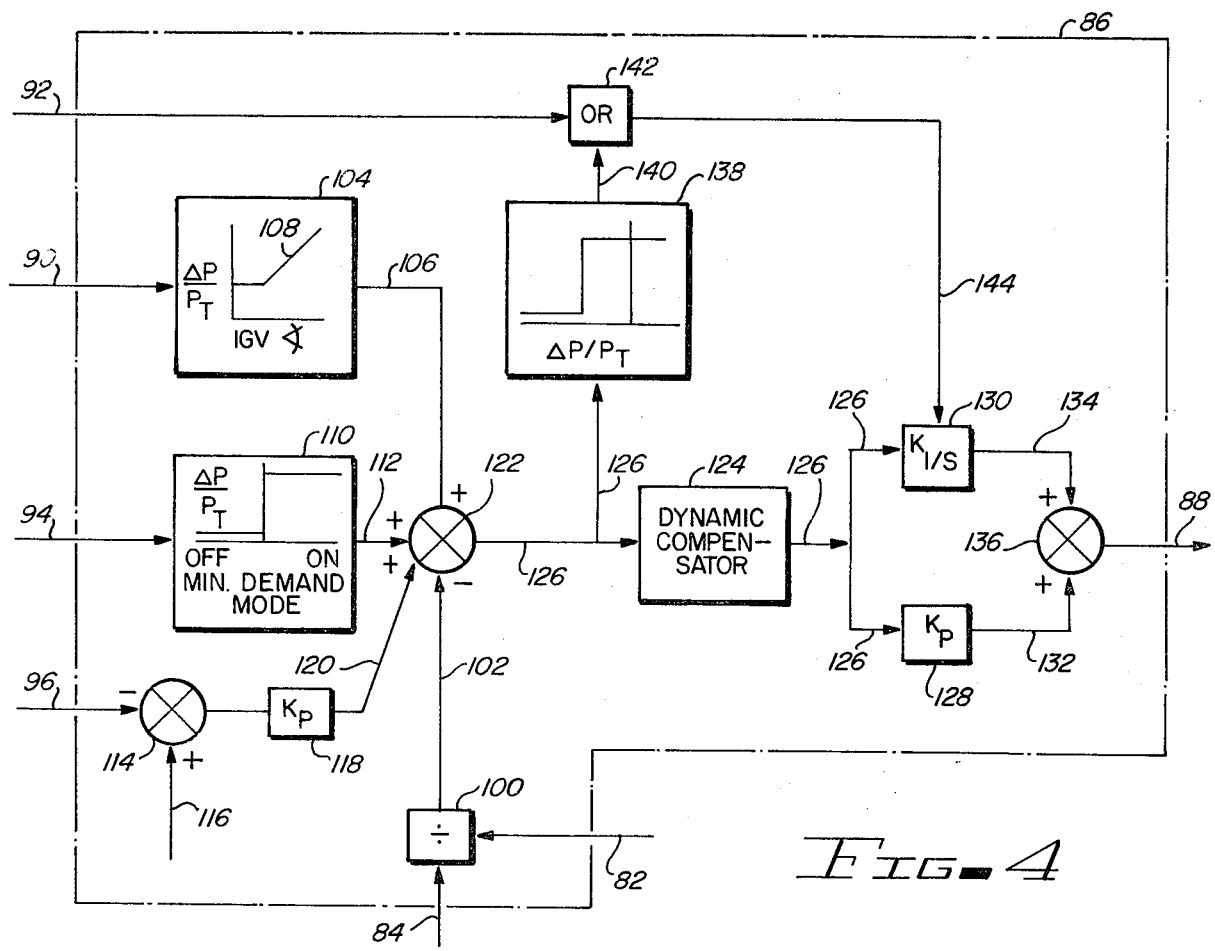
Fig-4
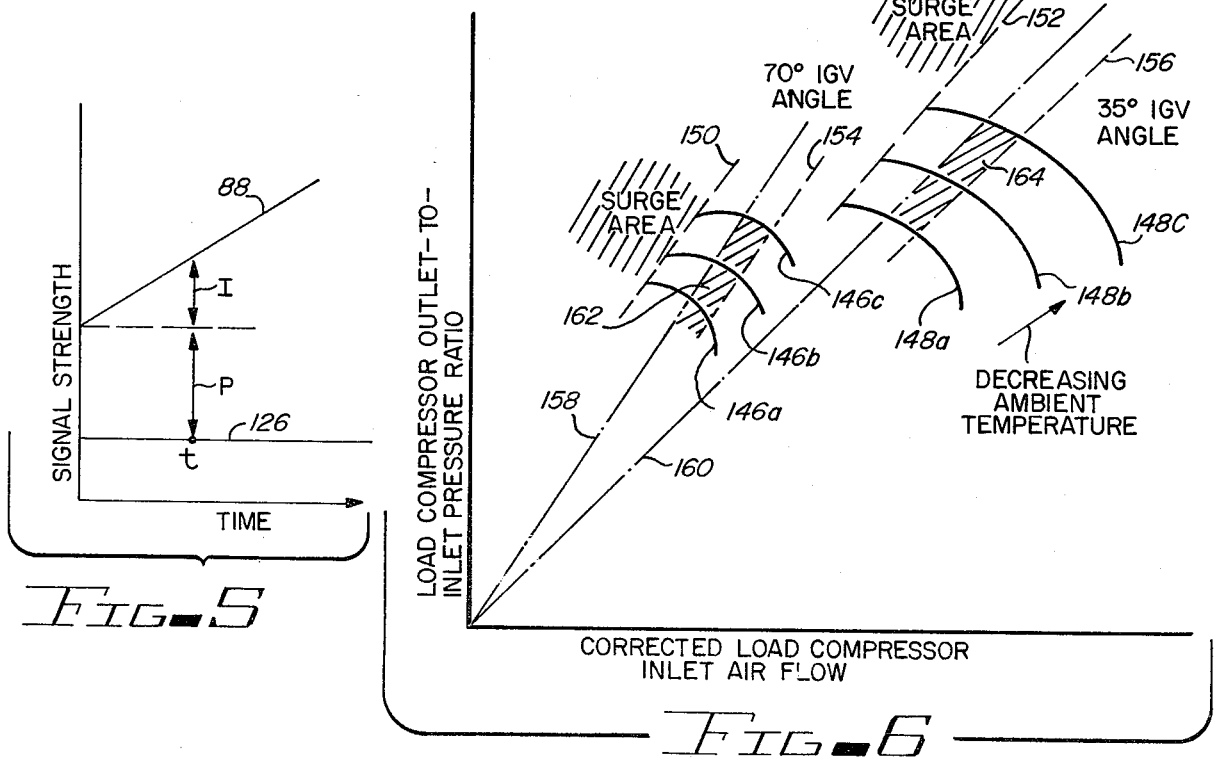
Fig-5
Fig-6

COMPRESSOR BLEED AIR CONTROL APPARATUS AND METHODS

This is a division of application Ser. No. 235,794 filed Feb. 19, 1981 now U.S. Pat. No. 4,380,893.

BACKGROUND OF THE INVENTION

The present invention relates generally to apparatus and methods for regulating the flow rate of gas discharged from a compressor, and more particularly to a novel bleed air control system adapted to assure a constant minimum discharge flow rate in a compressor used to power pneumatically-operated aircraft accessory system and the like.

In addition to their traditional propulsion functions, gas turbine engines are often used as accessory power units (APU's) to supply mechanical and/or pneumatic power to a wide variety of aircraft accessory devices and systems. Accessory system pneumatic power is typically provided by forcing bleed air from the APU compressor section through a main bleed duct to the accessory system's supply inlet via a branch supply duct connected to and defining a terminal portion of the main duct. In order to prevent surge of the APU compressor used to power the pneumatic accessory system, it is necessary to maintain a certain minimum flow rate through the main bleed duct.

However, the APU-supplied accessory system normally has a widely fluctuating compressed air requirement and is automatically controlled to correspondingly regulate the amount of bleed air it receives from the compressor by modulation of an accessory valve positioned in the branch supply duct.

To accommodate a decrease in accessory air demand, and maintain the compressor through flow above its surge leve, a surge bleed duct is typically connected to the main bleed duct to provide an alternate outlet flow path for the compressor bleed air as flow through the branch supply duct is diminished by a closing of the accessory system valve. Flow through the surge bleed duct is regulated by modulating a surge bleed valve positioned therein.

Conventional bleed air control systems employ mechanical devices, such as diaphragm controllers, to proportionally operate the surge bleed valve in response to deviations in main duct flow rate from a desired value thereof. More specifically, as the main duct flow rate begins to deviate from a predetermined value, and error signal is generated and the control system responsively modulates the surge bleed valve to a degree directly proportional to the magnitude of the error signal.

Such conventional control of the surge bleed valve requires that the valve be initially opened at a total compressor bleed air level substantially higher than the minimum flow level (i.e., a flow level exceeding the surge level by a reasonable margin of safety) required to prevent surge of the compressor. The early surge valve opening, necessitated by the steady-state droop characteristics of proportional control which cause the surge valve operating line to be angled relative to the compressor surge line, results in a sizable amount of excess surge bleed air being dumped to atmosphere as the surge valve is moved toward its fully open position. This heretofore unavoidable excess surge bleed air causes increased APU fuel consumption, results in increased surge bleed noise, decreases total power available from the APU, and limits the maximum supply pressure available to the pneumatically-powered accessory system.

SUMMARY OF THE INVENTION

Accordingly, it is an object of the present invention to provide an improved compressor system, and a bleed air control system and methods therefor, which eliminates or minimizes the above-mentioned excess surge bleed air flow as well as other problems and disadvantages.

The present invention provides an electronic bleed air control system which senses a flow-related control parameter within the main compressor bleed duct and responsively generates an error signal indicative of the difference between the sensed value of the parameter and a desired value thereof. The error signal is converted to two signals, one of which is proportional to the error signal and the other of which represents the integral, as a function of time, of the error signal. These two control signals are used simultaneously to modulate the surge bleed valve.

This unique combination of integral and proportional control of the surge bleed valve yields a valve operating or control line which is essentially parallel to the compressor surge line, thus allowing the initial surge valve opening to be delayed until the compressor bleed flow rate is only slightly above its surge rate. Because of the greatly improved surge valve control characteristics afforded by the present invention, the only excess surge bleed air required is that needed to provide a reasonable safety margin above the surge flow rate, and is essentially constant for all positions of the surge valve.

In a preferred embodiment of the present invention, the electronic control system is used in conjunction with a gas turbine engine accessory power unit (APU) to supply compressed air to a pneumatically-operated accessory system having a variable air demand. The APU has a load compressor which is provided with adjustable inlet guide vanes. Connected to the compressor is a main bleed air duct having a branch supply duct interconnecting the main duct with the accessory system, and a surge bleed duct (and associated surge bleed valve) for dumping bleed air to atmosphere as the accessory system air demand diminishes.

In this preferred embodiment, the electronic control system comprises flow sensor means for sensing within the main bleed duct the value of the flow-related parameter $(P_t-P_s)/P_t$, $P_t$ being the total pressure within the main duct, and $P_s$ being the static pressure therein. Means are provided for comparing the sensed value of such parameter to a desired value thereof and responsively generating a error signal representing the difference between the sensed and desired parameter values. The error signal is transmitted in parallel to a proportional controller and an integral controller whose outputs are combined by a summing device to form the combined proportional-and-integral control signal which ultimately regulates the position of the surge bleed valve.

Additionally, means are provided for automatically resetting the desired value (or "set point") of the flow parameter as a function of the position of the load compressor inlet guide vanes. The use of the particular flow parameter $(P_t-P_s)/P_t$, coupled with the correlation of the set point value with the inlet guide vane position, uniquely provides for optimum control system performance, maintaining the surge valve control line essentially parallel to the compressor surge flow line despite wide variations in compressor through flow and ambient temperatures.

BRIEF DESCRIPTION OF THE DRAWINGS

FIG. 4 is an enlarged schematic diagram showing the components of the electronic controller portion of the control system of FIG. 1;

FIG. 5 is a graph depicting the relationship between the electronic controller output signal and an error signal generated by the control system of FIG. 1; and FIG. 6 is a graph illustrating the relationship between the control system flow parameter and the position of the load compressor inlet guide vanes of the accessory power unit.

DETAILED DESCRIPTION

Figure 1:
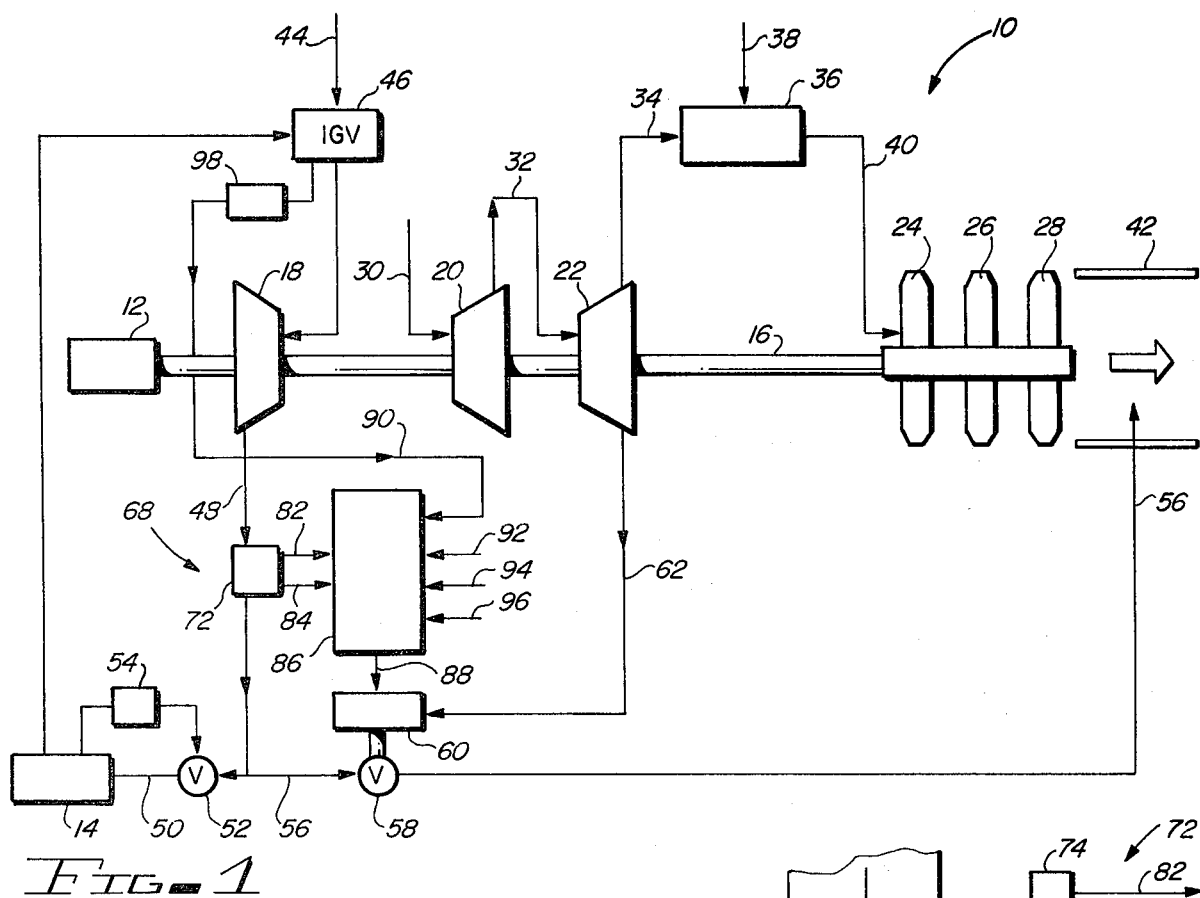
FIG. 1 is a schematic diagram of a gas turbine engine accessory power unit in which is incorporated a compressor bleed air control system embodying principles of the present invention.

A gas turbine engine accessory power unit (APU) 10 is schematically illustrated in FIG. 1 and constitutes a preferred embodiment of the present invention. Accessory power units such as APU 10 are typically used to provide mechanical power to a driven accessory such as a generator 12, and to simultaneously supply compressed air to an accessory system such as an aircraft environmental control system 14 or to other pneumatically-operated devices such as air turbine motors and the like.

APU 10 includes a power shaft 16 drivingly coupled at its left end (through a gearbox not shown in FIG. 1) to the generator 12. Fixedly mounted on shaft 16 for rotation therewith are, from left to right along its length, a centrifugal load compressor 18, first and second stage centrifugal power compressors 20, 22, and first, second, and third stage axial power turbines 24, 26, and 28, positioned at the right end of the shaft 16.

During operation of the APU, ambient air 30 is drawn into the inlet of the first stage power compressor 20, compressed, and then discharged through duct 32 into the inlet of the second stage power compressor 22 where it is further compressed. Compressor 22 discharges the further compressed air through a duct 34 into a combustor 36. The compressed air entering combustor 36 is mixed with fuel 38 also supplied to the combustor to form a fuel-air mixture which is continuously burned therein. Expanded gas 40 exiting the combustor is forced axially through the power turbines 24, 26, 28 to supply rotational power to the shaft 16 and is exhausted from the APU to atmosphere through a discharge passage 42 positioned immediately downstream of the power turbines.

The rotation of the shaft 16 drives the generator 12 (or other mechanically-driven accessories) and also rotationally drives the load compressor 18 which is used to supply compressed air to the pneumatically-operated accessory system 14. Ambient air 44 is drawn through a set of adjustable inlet guide vanes (IGV) 46 into the inlet of the load compressor 18. Compressed air exiting (or "bled" from) compressor 18 is forced through a main bleed air duct 48, and then through a branch bleed air supply duct 50 connected to main duct 48, to supply compressed air to the accessory system 14. Branch bleed duct 50 is sized to flow to the accessory system 14 the entire volume of compressed air discharged from the load compressor 18.

The amount of compressor bleed air received by system 14 is conventionally regulated by a valve or damper 52, positioned in the branch bleed duct 50, which is controlled by a volume controller 54 operatively connected between the system 14 and the valve 52. Upon sensing an increase in system compressed air demand, the controller 54 modulates valve 52 toward a fully open position. Conversely, upon sensing a decrease in system compressed air demand, the controller 54 modulates valve 52 toward a fully closed position.

The bleed air-producing load compressor 18 is conventionally designed for maximum efficiency at rated load. Therefore, a certain minimum through flow of air is required to prevent compressor surge (i.e., stall on the blades of compressor 18). Because of the varying compressed air demand of accessory system 14, it is necessary to provide an alternate outlet flow path (i.e., in addition to branch bleed air duct 50) for the bleed air flowing through the main duct 48 in the event that the quantity of bleed air flow through branch duct 50 falls below the minimum required to prevent a surge condition in compressor 18. More specifically, when the valve 52 restricts the flow of bleed air in branch duct 50 to below the minimum surge-prevention quantity, an additional bleed air outlet passage must be provided from the main bleed duct 48.

To accomplish this relief function, a surge bleed duct 56 is connected to the main bleed duct 48 and extended therefrom into the APU discharge passage 42. Like the branch bleed duct 50, surge bleed duct 56 is sized to accommodate the entire flow of bleed air through the main duct 48 in the event that the control valve 52 closes completely, in which case all of the bleed air discharged from the load compressor 18 is dumped into the discharge passage 42 through the surge bleed duct 56.

Compressed air flow through the surge bleed duct 56 is regulated by variable surge flow restriction means in the form of a surge bleed valve or damper 58 installed in the surge bleed duct 56. Surge bleed valve 58 is positioned by a torque motor 60 which is powered by bleed air 62 from the second stage power compressor 22.

It is to the control of the surge bleed valve 58, in response to the varying compressed air demands of the accessory system 14, that the present invention is directed. The conventional method of regulating the surge bleed valve 58 is to employ a mechanical control system which senses the pressure within the main bleed duct 48 (or another parameter related to the total air flow therethrough) and generates an error signal indicative of the magnitude of the deviation of such parameter from a desired value thereof. This error signal is used to proportionally control the surge bleed valve to thereby maintain the bleed flow in duct 48 above the minimum required to prevent compressor surge. More specifically, conventional control systems modulate the surge bleed valve to a degree which is simply proportional to the strength of the mechanical error signal. The limitations and disadvantages of proportional surge bleed valve control are well known and are graphically depicted in FIG. 2.

Figure 2:
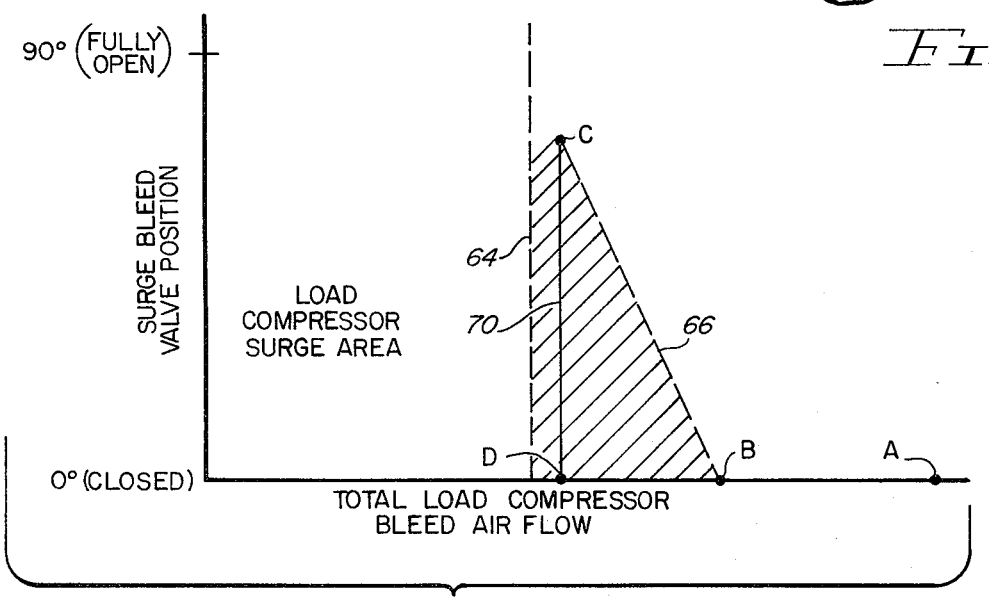
FIG. 2 is a graph which comparatively depicts the surge bleed valve control characteristics of the control system of FIG. 1 and those of a conventional, proportional control system.

In FIG. 2 point A represents, for a selected inlet guide vane position, the total load compressor bleed air flow through main duct 48 with surge bleed valve 58 fully closed and accessory valve 52 fully open. The vertical dashed line 64 to the left of point A is the surge line of the load compressor 18, a total compressor bleed flow to the left of the surge line causing compressor surge.

With conventional proportional control of surge bleed valve 58, its control line (dashed line 66 in FIG. 2) is inclined leftwardly relative to the vertical because of the droop characteristics inherent in proportional control. Thus, in order to assure that the total compressor bleed air flow is slightly above its surge flow level (by a suitable safety margin of from 5 to 15 percent) when the surge valve is open to an extent necessary to cause full bleed flow through duct 56 (i.e., at point C, at which point the surge valve is somewhat less than fully open in accordance with customary design practice), it is necessary to initially open the surge valve at point B—a point well to the right of point C. This very early initial opening of the surge valve causes a rather sizable excess of surge bleed air to be dumped to atmosphere to accommodate the proportional control drop. Such excess bleed air is graphically depicted in FIG. 2 by the cross-hatched area between lines 64 and 66.

The large excess surge bleed air requirement of conventional proportional control of the surge bleed valve results in increased fuel consumption of the APU, creates additional bleed air noise, limits the bleed air pressure available to the pneumatically-operated accessory system 14, and reduces the total usable power output of the APU.

The present invention provides a unique electronic control system, indicated generally at 68 in FIG. 1, which inexpensively solves these problems. In a novel manner described below, control system 68 operates the surge bleed valve along a control line 70 (FIG. 2) which is substantially parallel to the surge line 64 and extends through point C just slightly to the right of the surge line. With the control line 70 thus shifted relative to the conventional control line 66, an initial surge valve opening point D is provided which, like point C, is positioned slightly to the right of the surge line. Thus, as the accessory valve 52 begins to close off and the total compressor bleed air flow begins to decrease (i.e., move leftwardly from point A) a much later initial opening of the surge valve occurs. As can readily be seen in FIG. 2, the clockwise rotation of the surge valve control line (relative to the conventional control line 66) by the control system 68 eliminates all of the excess surge bleed flow between lines 66 and 70. The only excess surge bleed air flow remaining, represented by the cross-hatched area between lines 64 and 70, is that necessary to maintain a predetermined margin of safety during operation of the APU.

THE ELECTRONIC SURGE BLEED VALVE CONTROL SYSTEM

Figure 3:
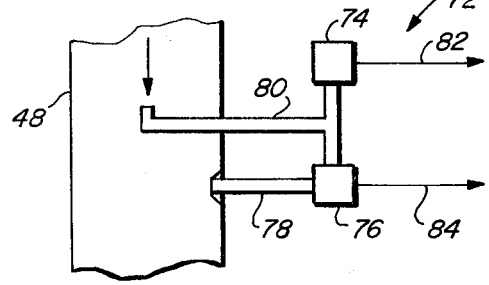
FIG. 3 is an enlarged, schematic illustration of the flow sensor portion of the control system of FIG. 1.

Referring now to FIGS. 1, 3 and 4, the electronic control system 68 includes a flow sensor 72, connected to the main bleed air duct 48, which comprises a total pressure transducer 74 and a differential pressure transducer 76. A static pressure probe 78 extends into the main duct 48 and is coupled to the static pressure inlet of the differential transducer 76. Additionally, a total pressure probe 80 extends into the duct 48 and is coupled to the inlet of the total pressure transducer 74 and the total pressure inlet of the differential transducer 76. The flow sensor 72 transmits an output signal which comprises the combination of electric signals 82, 84 from the transducers 74, 76 respectively. Signal 82 is indicative of the total pressure ($P_t$), and signal 84 is indicative of the difference ($P_t$-$P_s$) between the total and static pressures within main duct 48.

Transducer output signal 82, 84 are received by an electronic controller 86 which responsively transmits an electric control signal 88 to the valve motor 60 to vary the amount of power compressor bleed air 62 it receives, and thus vary the modulating force on the normally open surge bleed valve 58 in a manner achieving the very desirable surge valve control line 70 of FIG. 2.

Also received by controller 86 are electric input signals 90, 92, 94 and 96, as indicated in FIGS. 1 and 4, which function as subsequently described to reset the controller 86. Input signal 90 is transmitted to the controller 86 by an inlet guide vane position sensor 98 and is indicative of the actual position (i.e., opening angle) of the inlet guide vanes 46. Input signal 92 is manually generated and resets controller 86 to an accessory system zero demand (or "idle") mode in which, by means not shown, the inlet guide vanes are closed. Input signal 94, also manually generated, resets controller 86 to an accessory system minimum demand mode and, also by means not shown, moves the inlet guide vane to a predetermined minimum opening position. Input signal 96 emanates from a pressure sensor (not shown) in the load compressor inlet and is indicative of the pressure therein.

Referring now to FIG. 4, the electronic controller 86 includes a divider 100 which receives the pressure transducer output signals 82, 84 and responsively generates an electric output signal 102 whose magnitude represents the value of the sensed control parameter, ($P_t$-$P_s$)/$P_t$ of the control system 68.

Reset signals 90, 94, 96 are used to combinatively define a desired value, or set point, of the main bleed flow-related control parameter ($P_t$-$P_s$)/$P_t$. Signal 90, emanating from the guide vane position sensor 98 is used to adjust such set point as a function of the angular position of the inlet guide vanes 46. This guide vane-related adjustment is accomplished by a function generator 104 which receives reset signal 90 and responsively generates an output signal 106 related to signal 90 according to a predetermined, generally linearly increasing reset schedule 108 as graphically illustrated in FIG. 4.

As will be seen, the use of the control parameter ($P_t$-$P_s$)/$P_t$, and the automatic adjustment of its set point value in response to changes in inlet guide vane position, assure that a constant minimum load compressor bleed flow rate, between the compressor surge rate and the maximum accessory demand flow rate, is maintained by the control system 68 despite wide variations in inlet guide vane position and ambient temperatures.

Signal 94, generated when the accessory system minimum demand mode is manually selected, is received by a signal generator 110 which transmits an output signal 112 whose magnitude is constant.

The third control point reset signal, signal 96, which is indicative of the load compressor inlet pressure, is received by a comparator 114 which also receives an electric reference input signal 116 having a constant magnitude representative of sea level atmospheric pressure. Comparator 114 generates, through a multiplier 118, an output signal 120 which is proportional to the difference in magnitude between signals 96 and 116, thus being indicative of the actual altitude of APU 10.

The three reset control signals, 106, 112, 120, and the signal 102 (which represents the actual sensed value of the flow parameter $(P_t-P_s)/P_t$ within the main bleed duct 48), are received by a comparator 122 which transmits, through a dynamic compensator 124, an error signal 126 whose magnitude is indicative of the difference between the actual value of the flow control parameter and the desired value thereof - namely the sum of the magnitudes of signals 106, 112 and 120. Dynamic compensator 124 functions in a conventional manner to provide lead-lag dynamic compensation to error signal 126, thereby improving its transient response characteristics without affecting its steady state values.

It can be see in FIG. 4 that the set point value of the main bleed flow parameter $(P_t-P_s)/P_t$ is increased by the control system 68 in three members - (1) an increased opening of the inlet guide vanes, (2) a selection of the accessory system minimum demand mode and/or (3) an increase in the altitude of the APU. Conversely, the set point is decreased by a reduction in the magnitude of any of the signals 106, 112, 120.

Error signal 126 is supplied in parallel to a proportional controller 128 and an integral controller 130. Controller 128, 130, respectively, transmit electrical output control signals 132, 134 which are received by a summer 136. The magnitude of output signal 132 is a predetermined multiple of the magnitude of error signal 126, while the magnitude of output signal 134 is the integral, as a function of time, of the error signal 126.

The summer 136 combines, or superimposes, the proportional and integral control signals 132, 134 and outputs the combined control signal 88 which is used to regulate the torque motor 60 (FIG. 1), and thus modulate the surge bleed valve 58. As can be seen in FIG. 5, the output signal 88 from the electronic controller 86 has a magnitude which linearly increases relative to the magnitude of the error signal 126 as a function of the duration of such error signal, and has, at a given time t, both an integral component I and a proportional component P. The flow rate of surge bleed air exhausted through duct 56 is thus related to the magnitude of deviation of the parameter $(P_t-P_s)/P_t$, from its set point value, in both a proportional and time-integral manner.

It is this unique use of proportional and integral system control, afforded by the parallel controllers 128, 130, which imparts the characteristics to the ultimate valve-controlling signal 88 that substantially eliminate the excess surge bleed problems previously described and long-associated with conventional proportional control of surge bleed valve 58.

More specifically, it has been discovered that this addition to the valve-controlling signal 88 of the integral component I (i.e., the integrated output signal 134) makes possible the ideally positioned valve control line 70 (FIG. 2), thereby eliminating the previously unavoidable wastage of surge bleed air represented by the area between lines 66 and 70 in FIG. 2. The resulting control line 70, since it is essentially parallel to surge line 64, greatly delays the required initial opening of the surge valve (compared to conventional proportional valve control), as previously described, when the total compressor bleed air flow rate begins to a diminish.

In sum, the illustrated control system 68 provides a constant minimum total bleed air flow rate (line 70) instead of the wasteful varying minimum flow rate (line 66) of previous surge valve control systems. Under the greatly improved control of system 68, once the surge valve 58 is initially opened the flow through main duct 48 remains essentially constant regardless of degree to which the surge valve is further opened.

Referring again to FIG. 4, the error signal 126 received by the parallel controllers 128, 130 is also transmitted to a "kicker" control 138. When error signal 126 reaches a predetermined maximum level (indicating a predetermined maximum deviation between the actual value of the flow parameter $(P_t-P_s)/P_t$ and its set point), the kicker 138 transmits a constant value output signal 140 to an OR gate 142 which also receives signal 92 (the manually selected accessory system zero demand signal). If the OR gate 142 receives either of the signals 92, 140 it immediately transmits to the integral controller 130 an electrical integrator shutoff signal 144 which interrupts current flow therethrough, thereby allowing the surge valve 58 to move, at its maximum slew rate, toward its normally open position.

Thus, for example, if the total bleed flow rate in main duct 48 experiences a very rapid diminution, the kicker 138 acts as a safety mechanism to compensate for this condition by snapping the surge valve to a more open position until the error signal returns to below its predetermined maximum allowable level. Selection, via signal 92, of the zero accessory system demand mode, which closes the accessory valve in a manner not shown, also de-energizes the integrator 130 and rapidly opens the surge valve to prevent compressor stall which might otherwise result from a sudden closing of the accessory valve.

As previously mentioned, the selection of the flow-related main bleed air control parameter $(P_t-P_s)/P_t$ affords the control system certain operational advantages. Such advantages will now be described with reference to FIG. 6.

In FIG. 6 two sets of constant temperature load compressor operating lines, 146a, 146b and 146c, and 148a, 148b and 148c, are plotted against the coordinates of load compressor outlet-to-inlet pressure ratio and corrected load compressor inlet air flow for two representative inlet guide vane angles, 70° and 35°. For the 70° inlet guide vane angle the load compressor surge line is represented by dashed line 150, while the surge line of the load compressor for the 35° inlet guide vane angle is represented by dashed line 152. To the right of, and substantially parallel to, the surge lines 150, 152 are plotted representative maximum accessory system flow rate demand lines 154, 156 which respectively correspond to the 70° and 35° guide vane angles.

Finally, there are plotted on the graph of FIG. 6 two control parameter lines 158, 160, each of which represents a different constant value of the main bleed duct flow parameter $(P_t-P_s)/P_t$ used in the preferred embodiment of the present invention.

Two important characteristics of the parameter lines 158, 160 should be noted. First, each such line, as it passes through the compressor operating lines, has a constant slope, indicating that the selected parameter $(P_t-P_s)/P_t$ is insensitive to variations in compressor inlet (i.e., ambient) temperature. Secondly, each of the parameter lines 158, 160 extends between and is essentially parallel to a different one of the surge and demand line pairs 150, 154 and 152, 156. The lines 158, 160 thus respectively define ideal potential load compressor operating areas 162 (the cross-hatched area bounded by lines 146a, 156, 146c and 158) and 164 (the cross-hatched area bounded by lines 148a, 156, 148c and 160), such potential operating areas having substantially constant minimum flow rates paralleling their associated surge lines.

The achievement of these optimum compressor operating areas, defined in part by the flow parameter lines 158, 160, is, of course, made possible by the previously described novel integral and proportional surge valve control built into the control system 68.

Another reason why the use of this particular flow control parameter is operationally advantageous is that the optimum value of such parameter for each guide vane angle is essentially linearly related to the particular inlet guide vane angle. This generally linear relationship permits the use of the relatively simple linear function generator 104 (FIG. 4) to properly reset the desired value of the flow parameter as a function of the inlet guide vane position.

The bleed air control principles of the present invention are applicable to a wide variety of compressor bleed applications and are not limited to the APU load compressor application described above. For example, the proportional-plus-integral surge valve control method of the present invention is equally well adapted to the situation where partial bleed-off of the compressed air discharged from a power compressor (as distinguished from a load compressor) is used as the air source for a pneumatically-operated accessory system.

Additionally, while the control parameter $(P_t-P_s)/P_t$ is particularly well suited to the illustrated load compressor bleed application, other flow-related parameters (such as $P_t-P_s$) could be used if desired. Moreover, the signals used to adjust the control set point (i.e., the illustrated altitude, minimum demand mode, and inlet guide vane adjustment signals) could be varied to suit the particular bleed air application. One example of such variation would be the deletion of the guide vane adjustment of the control set point in the situation where the bled-from compressor does not have adjustable guide vanes.

To summarize, the control system 68, with its integral-plus-proportional control feature, provides apparatus and methods for eliminating the large amount of wasted surge bleed air associated with previous surge valve control systems. This is accomplished by using relatively standard, rugged and reliable electronic components. The greatly improved control provided by this invention reduces fuel consumption and surge bleed air usage and noise, yet at the same time increases the maximum air pressure available to the pneumatic accessory system 14 and the maximum shaft power available to the mechanically-driven accessory 12.

The foregoing detailed description is to be clearly understood as given by way of illustration and example only, the spirit and scope of this invention being limited solely by the appended claims.

What is claimed is:

1. A method of controlling a surge bleed valve, positioned in a surge outlet passage of a compressed air supply duct interconnected between the outlet of a compressor and the inlet of pneumatically-powered apparatus having a variable supply air demand, to assure a predetermined, essentially constant minimum flow rate through the supply duct despite fluctuations in the supply air demand of the pneumatically-powered apparatus, the compressor having adjustable inlet guide vanes, said method comprising the steps of:

(a) producing a first control signal having a magnitude proportionally related to the magnitude of deviation, from a desired flow rate, of the actual flow rate through the supply duct;

(b) producing a second control signal whose magnitude is the integral, as a function of time, of said magnitude of flow rate deviation, said control signal producing steps (a) and (b) being performed by generating an error signal having a magnitude representing said magnitude of flow rate deviation, providing a proportional controller, providing an integral controller, and transmitting said error signal to each of said controllers, said generating of said error signal including the steps of sensing within the supply duct the value of the parameter $(P_t-P_s)/P_t$, $P_t$ being the total pressure within the supply duct and $P_s$ being the static pressure therein, and transmitting a signal indicative of the sensed value of said parameter to an inlet of a comparator having an adjustable set point; and (c) adjusting said set point in response to variations in the position of the inlet guide vanes.

2. The method of claim 1 wherein said set point adjusting step is performed by adjusting said set point to a degree essentially linearly related to changes in the position of the inlet guide vanes.

3. A method of utilizing a compressor of a gas turbine engine to power pneumatically-operated apparatus having a variable inlet air flow demand, said method comprising the steps of:

(a) interconnecting a supply duct between the compressor and the pneumatically-operated apparatus;

(b) flowing discharge air from the compressor through said supply duct to the pneumatically-operated apparatus;

(c) maintaining an essentially constant minimum supply duct flow rate, despite fluctuations in the flow rate of air received by the pneumatically-operated apparatus, by exhausting air from said supply duct in response to variations therein of the value of a predetermined, flow-related parameter, the flow rate of air exhausted from said supply duct being related to the magnitude of said parameter value variations in both a proportional and time-integral manner, said maintaining step including the steps of providing an outlet passage from said supply duct, positioning in said outlet passage a surge bleed valve operable to selectively vary the flow of air outwardly through said outlet passage, generating an integral control signal in response to said variation in said flow-related parameter, generating a proportional control signal in response to said variations in said flow-related parameter, and simultaneously utilizing said integral and proportional control signals to operate said surge bleed valve; and (d) interrupting said integral control signal when the difference between the actual value of said parameter and a desired value thereof exceeds a predetermined level.

4. A method of utilizing a compressor of a gas turbine engine to power pneumatically-operated apparatus having a variable inlet air flow demand, the compressor having adjustable inlet guide vanes, said method comprising the steps of:

(a) interconnecting a supply duct between the compressor and the pneumatically-operated apparatus;
(b) flowing discharge air from the compressor through said supply duct to the pneumatically-operated apparatus;
(c) maintaining an essentially constant minimum supply duct flow rate, despite fluctuations in the flow rate of air received by the pneumatically-operated apparatus, by exhausting air from said supply duct in response to variations therein of the value of a predetermined, flow-related parameter, the flow rate of air exhausted from said supply duct being related to the magnitude of said parameter value variations in both a proportional and time-integral manner, said maintaining step including the steps of providing an outlet passage from said supply duct, positioning in said outlet passage a surge bleed valve operable to selectively vary the flow of air outwardly through said outlet passage, generating an integral control signal in response to said variation in said flow-related parameter, generating a proportional control signal in response to said variations in said flow-related parameter, and simultaneously utilizing said integral and proportional control signals to operate said surge bleed valve; and
(d) adjusting the relationship between the magnitudes of said integral and proportional control signals and the magnitudes of said parameter variations as a function of the position of the inlet guide vanes.

* * * * *